(12) United States Patent
Anand et al.

(10) Patent No.: US 11,095,384 B2
(45) Date of Patent: *Aug. 17, 2021

(54) RE-TIMING A PACKETIZED RADIO FLOW TO CLEAN NOISE INDUCED BY PACKET DELAY VARIATION OF A PACKET NETWORK

(71) Applicant: Cisco Technology, Inc., San Jose, CA (US)

(72) Inventors: Prashant Anand, Bangalore (IN); Sudhir Kayamkulangara, Karnataka (IN); Dinuraj K, Karnataka (IN); Manigandan Boopalan, Bangalore (IN); Manoj Kumar, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,509

(22) Filed: Jan. 24, 2020

(65) Prior Publication Data

US 2021/0075532 A1 Mar. 11, 2021

Related U.S. Application Data

(63) Continuation of application No. 16/564,493, filed on Sep. 9, 2019, now Pat. No. 10,594,423.

(51) Int. Cl.
*H04L 29/06* (2006.01)
*H04J 3/06* (2006.01)

(52) U.S. Cl.
CPC .......... *H04J 3/0661* (2013.01); *H04J 3/0655* (2013.01); *H04J 3/0697* (2013.01); *H04L 69/22* (2013.01)

(58) Field of Classification Search
CPC .................. H04L 69/22; H04J 3/0697
See application file for complete search history.

(56) References Cited

U.S. PATENT DOCUMENTS 9,525,482 B1 * 12/2016 Tse ................... H04B 10/0795
9,692,514 B2 * 6/2017 Laraqui ........... H04B 10/25753
(Continued)

FOREIGN PATENT DOCUMENTS

| WO | 2018104175 A1 | 6/2018 |
| WO | 2018189726 A1 | 10/2018 |
| WO | 2019045607 A1 | 7/2019 |

OTHER PUBLICATIONS

"Common Public Radio Interface: eCPRI Interface Specification", eCPRI Specification V1.2, (Jun. 25, 2018), 62 pages.
(Continued)

*Primary Examiner* — Parth Patel
(74) *Attorney, Agent, or Firm* — Edell, Shapiro & Finnan, LLC

(57) ABSTRACT

Techniques are described to provide for re-timing a packetized radio flow to clean noise induced by packet delay variation of a packet network. In one example, a method includes receiving, at a first node of a fronthaul network, a Radio over Ethernet (RoE) frame transmitted by a second node in which the RoE frame comprises a Common Public Radio Interface (CPRI) bit stream associated with a first radio device, a sequence number, and a first time stamp. The method may further include generating a second time stamp by the first node upon obtaining the RoE frame; calculating an induced delay value based, at least in part, on the first time stamp and the second time stamp; calculating a re-timing value based on a re-timing interval and the induced delay value; and transmitting the CPRI bit stream to a second radio device based on the re-timing value.

20 Claims, 9 Drawing Sheets

(56) References Cited

U.S. PATENT DOCUMENTS

| | | | | |
|---|---|---|---|---|
| 10,594,423 | B1* | 3/2020 | Anand | H04J 3/0664 |
| 10,863,386 | B1* | 12/2020 | Anand | H04W 28/04 |
| 2008/0270345 | A1* | 10/2008 | Barlow | G06F 16/81 |
| 2010/0215057 | A1* | 8/2010 | Frink | H04N 21/2389 370/474 |
| 2013/0100948 | A1* | 4/2013 | Irvine | H04W 88/085 370/350 |
| 2013/0163524 | A1* | 6/2013 | Shatzkamer | H04L 69/22 370/329 |
| 2013/0266323 | A1* | 10/2013 | Tan | H04Q 11/0067 398/115 |
| 2013/0329633 | A1* | 12/2013 | Dalela | H04L 12/4633 370/328 |
| 2015/0207714 | A1* | 7/2015 | Ruffini | H04J 3/065 370/350 |
| 2015/0249549 | A1* | 9/2015 | Martinotti | H04L 12/4633 370/242 |
| 2016/0134353 | A1* | 5/2016 | Lange | H04W 56/004 370/345 |
| 2016/0218818 | A1* | 7/2016 | Lorenz | H04J 3/065 |
| 2016/0337062 | A1* | 11/2016 | Ruffini | H04J 3/0658 |
| 2018/0192323 | A1* | 7/2018 | Zhang | H04W 28/065 |
| 2018/0206203 | A1* | 7/2018 | Ruffini | H04J 3/0655 |
| 2018/0217265 | A1* | 8/2018 | Pieroni | H04B 10/293 |
| 2018/0285227 | A1* | 10/2018 | Sharma | G06F 11/3037 |
| 2018/0324726 | A1* | 11/2018 | Griffioen | H04W 56/0055 |
| 2019/0342198 | A1* | 11/2019 | Ruffini | H04W 88/085 |
| 2019/0342594 | A1* | 11/2019 | Korte | H04N 7/0127 |
| 2020/0127806 | A1* | 4/2020 | Pacchetti | H04L 7/0075 |
| 2020/0252980 | A1* | 8/2020 | Anand | H04L 25/0262 |

OTHER PUBLICATIONS

"3rd Generation Partnership Project; Technical Specification Group Radio Access Network; Evolved Universal Terrestrial Radio Access (E-UTRA); Base Station (BS) radio transmission and reception", (Release 16), 3GPP TS 36.104 V16.2.0, (Jun. 2019), 285 pages.

"CPRI Protocol", Texas Instruments Wiki, 6 pages, downloaded from Internet Jan. 23, 2019; http://processors.wiki.ti.com/index.php/CPRI_Protocol.

"Common Public Radio Interface (CPRI); Interface Specification", CPRI Specification V7.0, (Oct. 9, 2015), 128 pages.

De la Oliva, Antonio, et al. "An overview of the CPRI specification and its application to C-RAN-based LTE scenarios." IEEE Communications Magazine 54.2 (2016): 7 pages.

Paul Hardy, "XCPRI: A Single-Chip CPRI PHY Layer Implemented in the Virtex-II Pro FPGA", XAPP761 (v1.1.1), May 9, 2007, www.xilinx.com, 27 pages.

"P1914.3™/D3.2 Draft Standard for Radio over Ethernet Encapsulations and Mappings", IEEE-SA Standards Board, P1914.3/D3, Jun. 2, 2018, 78 pages.

"P1914.3™/D3 1 Draft Standard for Radio over Ethernet 2 Encapsulations and Mappings 3", IEEE-SA Standards Board, P1914.3/D3, Jan. 2018, 74 pages.

"P1914.1™/D3.0 1 Draft Standard for Packet-based 2 Fronthaul Transport Networks", IEEE-SA Standards Board, P1914.1/D3.0, Nov. 2018, 95 pages.

"IEEE Draft Standard for Packet-based Fronthaul Transport Networks", IEEE Standard, P1914.1/D5.0, Apr. 2019, 2 pages, downloaded from Internet Jun. 5, 2019; https://ieeexplore.ieee.org/document/8703261.

Cho et al., "PoC of Structure agnostic Radio over Ethernet", IEEE Standards Association, 23 pages.

"IEEE Standard for Radio over Ethernet Encapsulations and Mappings", IEEE Standards Association, IEEE communications Society, IEEE Std 1914.3™—2018, Sep. 27, 2018, 77 pages.

Richard Maiden, "IEEE1914.3™ Standard for Radio over Ethernet Encapsulations and Mappings", NGNM Forum, Seattle, Oct. 25, 2017, 27 pages.

"Common Public Radio Interface: eCPRI Interface Specification", eCPRI Specification V2.0, (May 10, 2019), 109 pages.

International Search Report and Written Opinion in counterpart International Application No. PCT/US2020/049187, dated Nov. 10, 2020, 15 pages.

Chih-Lin I et al., "RAN Revolution With NGFI (xhaul) for 5G", Journal of Lightwave Technology, vol. 36, No. 2, https://ieeexplore.ieee.org/document/8078187, Jan. 15, 2018, 10 pages.

Tse, Richard et al., "Improving PTP Timestamping Accuracy on Ethernet Interfaces Draft Call for Interest—for consensus building", IEEE 802.3 NEA, May 30, 2019, 50 pages.

* cited by examiner

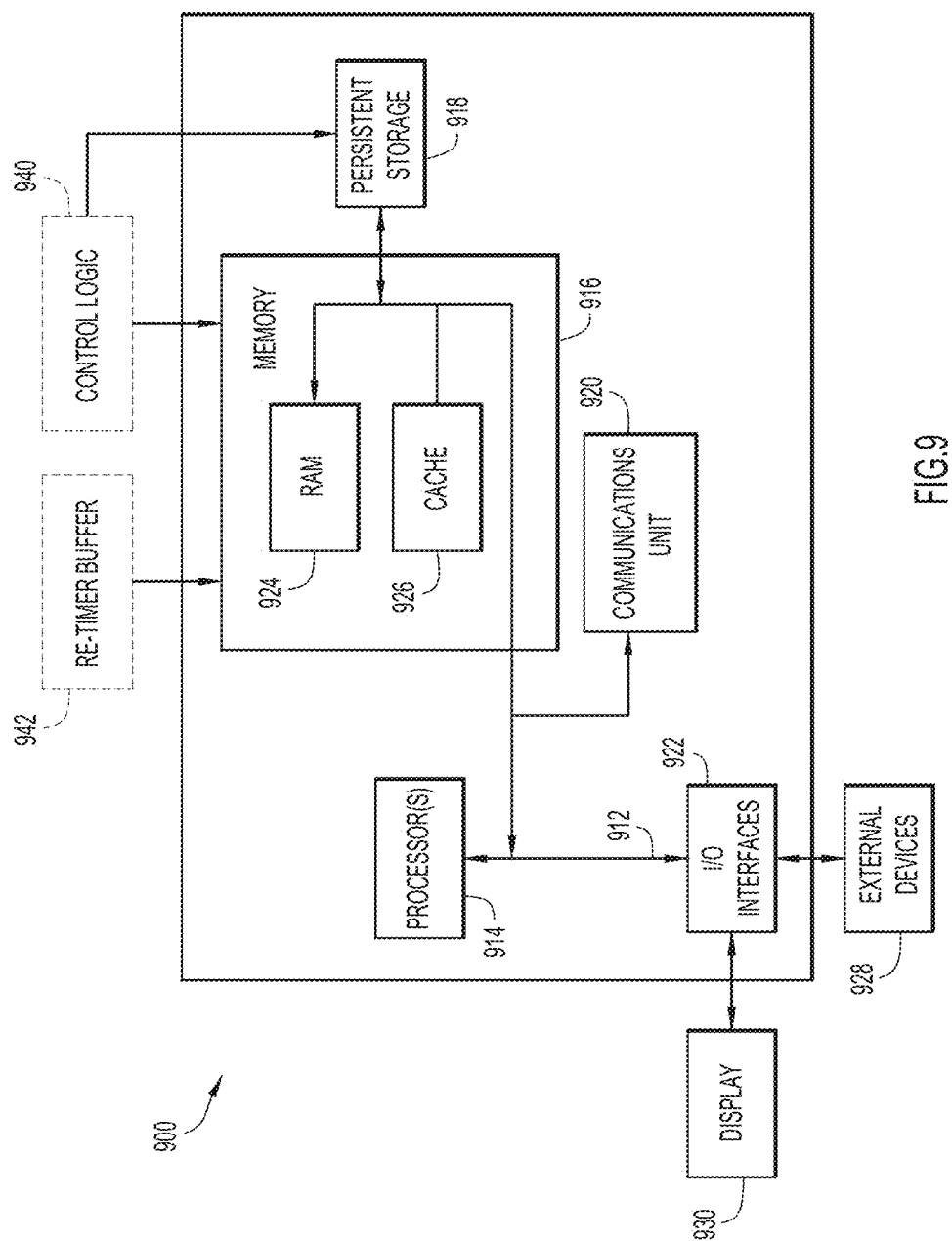

RE-TIMING A PACKETIZED RADIO FLOW TO CLEAN NOISE INDUCED BY PACKET DELAY VARIATION OF A PACKET NETWORK

CROSS-REFERENCE TO RELATED APPLICATION

This application is a continuation of and claims benefit to U.S. patent application Ser. No. 16/564,493, filed Sep. 9, 2019, the entirety of which is incorporated herein by reference.

TECHNICAL FIELD

The present disclosure relates to network equipment and services.

BACKGROUND

Mobile networking architectures have grown increasingly complex in communication environments. In particular, access network configurations for mobile networking architectures have become more complex. As access network configurations become more complex, facilitating communications among access network elements such as a radio equipment controller and radio equipment becomes more critical. Accordingly, there are significant challenges in facilitating communications between a radio equipment controller and radio equipment in a network.

BRIEF DESCRIPTION OF THE DRAWINGS

FIG. 9 is a hardware block diagram of a computing device that may perform functions of a proxy node re-timing a packetized radio flow to clean noise induced by packet delay variation (PDV) of a packet network, in connection with the techniques depicted in FIGS. 1-8.

DESCRIPTION OF EXAMPLE EMBODIMENTS

Overview

Figure 1:
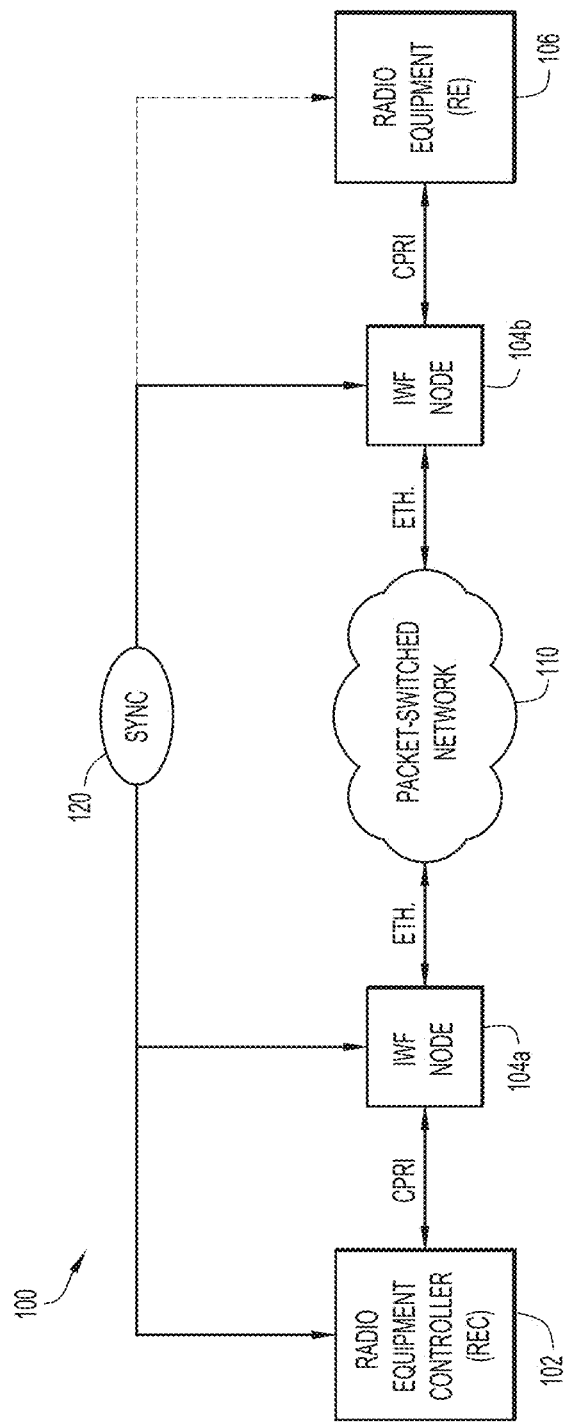
FIG. 1 is a block diagram of a fronthaul network in which techniques for re-timing a packetized radio flow to clean noise induced by packet delay variation (PDV) of a packet network may be implemented, according to an example embodiment.

Techniques presented herein may provide for re-timing a packetized radio flow in a fronthaul network for constant bit rate (CBR) traffic over Common Public Radio Interface (CPRI), which has strict jitter requirements. The packetized radio flow may include a CPRI bit stream that, in some implementations, may be used for frequency synchronization and during the creation of air interface carrier generation at a radio equipment (RE).

In an example embodiment, a method is provided and may include receiving, at a first node of a fronthaul network, a Radio over Ethernet (RoE) frame transmitted by a second node of the fronthaul network, wherein the RoE frame comprises a Common Public Radio Interface (CPRI) bit stream associated with a first radio device of the fronthaul network, a sequence number, and a first time stamp. The first node and the second node may be synchronized to a common clock. The method may further include generating a second time stamp by the first node upon obtaining the RoE frame; calculating an induced delay value based, at least in part, on the first time stamp and the second time stamp; calculating a re-timing value based on a re-timing interval and the induced delay value; and transmitting the CPRI bit stream to a second radio device of the fronthaul network based on the re-timing value.

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet or frame is a formatted unit of data that can contain control or routing information (e.g., source and destination address, source and destination port, etc.) and data, which is also sometimes referred to as a payload or data payload. In some embodiments, control or routing information, management information, or the like can be included in packet or frame fields, such as within header(s) and/or trailer(s).

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

In general, Common Public Radio Interface (CPRI) is a point-to-point technology that is based on a constant bit rate (CBR), always-ON bit-stream concept. In a traditional CPRI-based deployment, a radio equipment controller (REC) and a radio equipment (RE) follow the CPRI Specification and perform operations of a CPRI Master and a CPRI Slave, respectively.

Both the REC and RE are two basic building blocks of a radio base station. The REC generally operates to provide Network Interface transport, radio base station control and management, as well as digital baseband processing, whereas the RE provides the analog and radio frequency functions via a radio head such as filtering, modulation, frequency conversion and amplification or, more generally, RE serves as the air interface to one or more user equipment (UE). In some instances, a REC may also be referred to as a baseband unit (BBU). In some instances, a RE may also be referred to as a remote radio head (RRH) or a radio unit (RU).

Traditionally, a wireless fronthaul (also referred to as 'front haul') network may be implemented through CPRI over a point-to-point optical link. However, due to the bandwidth explosion of mobile networking architectures, such as Third Generation Partnership Project (3GPP) Fifth Generation (5G) architectures and/or Fourth Generation (4G)/Long Term Evolution (LTE) architectures, fronthaul networks are becoming packetized to gain from design advantages made possible through average rate/statistical multiplex (stat mux) gain and the cost effectiveness of packet-based (Ethernet-based) networks.

In packetized fronthaul networks the REC and RE do not interact directly as the direct fiber connection can be replaced with a packet-based network (e.g., an Ethernet-based network) between the REC and RE. Hence, there may be intermediate nodes in such a packet-based network that may interface with other nodes of the packet-based network while also interacting with the actual CPRI end points (e.g., the REC and RE may be considered the actual CPRI end points).

Traffic for CPRI is a 100% duty cycle traffic in that it is an antenna flow just after digitization of Radio Frequency (RF) signals (e.g., In-phase and Quadrature (I/Q) samples) from a radio front end in which most of the base band processing will happen at a central location (e.g., at an REC). In general, CPRI-based fronthaul use cases may involve the following aspects:

1. RE derives the Frequency and Phase Synchronization from REC

2. Frequency is derived from a CPRI bit stream at RE in which clock/data recovery (CDR) and jitter attenuation (JA) can be used to clean noise from the CPRI bit stream, which will be used for carrier frequency generation on the air interface at the RE.

3. Phase synchronization is overloaded term; it is important to emphasize that the CPRI synchronization plane provides frame timing alignment, not strictly clock phase alignment. Frame alignment, as referred to herein, may encompass means Hyper Frame Number (HFN) and eNodeB Basic Frame Number (BFN) counter alignment with an REC (e.g., for Z.64, Z.128, Z.192 (4-bits) control words).

4. Phase is used to generate slot interrupt (1 millisecond (msec), transmission time interval (TTI)), sub-slot interrupt (0.5 msec), and frame interrupt (10-msec).

Techniques presented herein will address two problems of packetized (e.g., Ethernet-based) fronthaul networks:

1. Primary Problem—Generally, an Ethernet domain may be considered as a transparent 'block' providing interconnection for a point-to-point CPRI link between a RE/RRH/RU and a REC/BBU. However CPRI, a commonly used fronthaul technology, requires no more than a 8.138 nanosecond (ns or nsec) one way jitter and a 16.276 ns round trip time (RTT) jitter (1/614 megabits per second (mbps)=16.276 nsec as per the CPRI Specification version 7.0 (v7.0)) for CPRI communications. Normal Ethernet technologies cannot meet these jitter requirements. Even with enhancements such as Institute of Electrical and Electronics Engineers (IEEE) 802.1Qbu frame preemption the CPRI jitter requirements cannot be met. For example, even in a best case single node, having no self-inference impact and being in a largely under-utilized network using Time-Sensitive Networking (TSN) IEEE 802.1Qbu, a one-way jitter of 114.4 ns over a 10 Gigabit Ethernet (10GE) interface or 11.44 ns over a 100 Gigabit Ethernet (100GE) interface will still be incurred.

2. Adjacent Problem—There are use cases for joint processing, which means packets at two nodes should be aligned within a minimum time de-skew. As per IEEE 802.1CM these numbers are given for various examples. One example is Evolved Universal Mobile Telecommunications System (UMTS) Terrestrial Radio Access (E-UTRA) Transmit (TX) Diversity and Multiple Input Multiple Output (MIMO), such as prescribed by 3GPP Technical Specification (TS) 36.104, having a minimum time de-skew=+/−32.5 nsec. Although de-jittering can be performed at a radio end point using a de-jitter buffer, if PDV in a network is higher than de-jittering that can be handled by the de-jitter buffer at the end point, then techniques presented herein can be used clean this noise on packet network edge; thereby bringing down the buffering requirements.

As noted previously, a CPRI bit stream can be used to recover the frequency at the RE for frequency synchronization (SYNC) and this frequency will be used can be used for carrier generation on the air interface for the RE. Thus, for more stable performance what is expected is that frequency wander should not be introduced at RE end. As noted previously for current systems where induced noise in form of PDV may be introduced, such noise can be filtered through de-jittering via a jitter buffer (also referred to as a de-jitter buffer). Due to network load changes, a jitter buffer fill level may continuously vary and can introduce wander in the RE. High frequency variations can be filtered but low frequency noise is not easy to filter and hence may show up as wander.

Techniques presented herein may provide for re-timing a packetized radio flow in a fronthaul network for CBR traffic over CPRI. The packetized radio flow may include a CPRI bit stream that may be used for frequency synchronization and during the creation of air interface carrier generation at a RE. In some implementations, techniques presented herein may also be used for minimizing Time Alignment Error (TAE) in a cluster of nodes with respect to relative de-skew of RoE frame arrival, as discussed in further detail below with regard to FIG. 8.

In at least one implementation, a use case for which techniques presented herein may be targeted may be as prescribed per the IEEE 1914.1 Specification, Section 7. For techniques presented herein, it can be assumed that the transport network clock and an REC or an REC cluster may use the same clock reference (e.g., Network_Clock=REC_Service_Clock); hence, service clock re-creation at the REC end is not needed. Stated differently, as all nodes may be traceable to a common reference clock, service clock recovery will not be needed at the CPRI-to-Ethernet interworking function (IWF) nodes as the clock is already available at these nodes. Instead, clock re-timing of data may be performed due to PDV induced by a packet-based (e.g., Ethernet, Multiprotocol Label Switching (MPLS), Segment Routing (SR), etc.) network.

Referring to FIG. 1, FIG. 1 is a block diagram of a fronthaul network 100 in which techniques for re-timing a packetized radio flow to clean noise induced by PDV of a packet network may be implemented, according to an embodiment. Fronthaul network 100 includes a REC 102, interworking function (IWF) nodes 104 (shown in FIG. 1 as IWF node 104a and IWF node 104b), and a RE 106. Fronthaul network 100 may also include a packet-switched network 110.

For fronthaul network 100, IWF nodes 104a and 104b at ends of the packet-switched network 110 are synchronized (120) with respect to frequency, phase, and Time of Day (ToD) using Synchronous Ethernet (SYNCE) and Precision Time Protocol (PTP) 1588 version 2 (1588v2) synchronization techniques. REC 102 and RE 106 are also tracking to the same reference frequency, phase and time with REC 102 being synchronized via SYNCE and PTP 1588v2 with IWF nodes 104 and RE 106 being synchronized via CPRI (e.g., derived from the CPRI bit stream, as discussed above). Thus, it is to be understood that REC 102, RE 106, and IWF nodes 104a and 104b are referenced to the same time scale for techniques presented herein.

Although not shown, REC 102 may further interface or otherwise communicate with a 3GPP mobile core network (not shown), such as any combination of a 3GPP 4G/LTE mobile core network and/or a 5G mobile core network. Further, RE 106 may further interface or otherwise communicate with one or more user equipment (UE) via over-the-air Radio Frequency (RF) communications.

IWF nodes 104a and 104b may be considered Ethernet nodes having capabilities to perform CPRI interactions with the REC and RE. The IWF nodes 104a and 104b may also perform operations to map a CPRI bit stream to RoE frames and operations to de-map RoE frames to a CPRI bit stream before playing out the CPRI bit stream towards a given CPRI end points (e.g., REC or RE). Stated differently, IWF nodes 104a and 104b may provide CPRI to Ethernet adaptation operations within fronthaul network 100.

Thus, in at least one embodiment, at least one CPRI interface element or port may be configured for each of IWF node 104a and IWF node 104b to facilitate CPRI communications with a CPRI end point. In at least one embodiment, at least one Ethernet interface element or port may also be configured for each of IWF node 104a and IWF node 104b to facilitate communications via packet-switched network 110. As illustrated in FIG. 1, the interconnection between REC 102 and IWF node 104a is a CPRI interconnection, the interconnection between IWF node 104a and packet-switched network 110 is an Ethernet interconnection, the interconnection between RE 106 and IWF node 104b is a CPRI interconnection, and the interconnection between IWF node 104b and packet-switched network 110 is an Ethernet interconnection.

The IEEE 1914.3 Specification describes methods to map a CPRI bit stream into RoE packets or frames and vice-versa to de-map RoE frames into a CPRI bit stream. Consider for techniques presented herein that the structure agnostic mode is used for mapping CPRI bit streams into RoE frames. While the IEEE 1914.3 Specification describes mapping/de-mapping methods, it does not specify any method for filtering PDV that may be introduced by a packet-switched network; rather, such procedures may be implementation specific. The IEEE 1914.3 Specification does provide a RoE frame format including a RoE header. Techniques presented herein may provide for the ability to flexibly use certain bits of a RoE header to achieve PDV filtering within fronthaul network.

During operation a given IWF node may receive a CPRI bit stream transmitted by a CPRI end point. Consider an example in which IWF node 104a may receive a CPRI bit stream transmitted by REC 102. In this example, IWF node 104a may be considered an ingress node and IWF node 104b may be considered an egress node for transmissions from IWF node 104a toward IWF node 104b via packet-switched network 110. Using techniques presented herein, IWF node 104a may map the received CPRI bit stream into RoE frames (a packetized radio flow), include a time stamp in a RoE header of the frames, and transmit the frames to an opposite end IWF node, such as IWF node 104b, via packet-switched network 110. The receiving IWF node 104b may de-map the CPRI bit stream from the RoE frames and transmit (also referred to as 'play out') the CPRI bit stream toward RE 106 using techniques presented herein. The transmission of the CPRI bit stream toward RE 106 may be delayed, also referred to herein as 'delay compensated', based, at least in part on the time stamp included in received RoE frames and a time stamp generated by the receiving IWF node 104b to account for any induced PDV that may be induced during communication of the RoE from IWF node 104a to IWF node 104b. This is only one example. In another example, the same operations can be performed in an opposite direction for RoE frames transmitted from IWF node 104b toward IWF node 104a. In this example, IWF node 104b may be considered an ingress node and IWF node 104a may be considered an egress node for transmissions from IWF node 104b toward IWF node 104a via packet-switched network 110.

Accordingly, techniques presented herein may be implemented for any IWF node of fronthaul network 100 for transmissions from a first IWF node toward a second IWF node via packet-switched network 110. Given that techniques presented herein may be implemented for any IWF node, depending on the direction of transmissions of a packetized radio flow from one CPRI end point towards an opposite end CPRI end point, various examples and/or discussions provided herein may reference IWF nodes, generally as IWF nodes 104 (e.g., transmit IWF node 104, receive IWF node 104, and variations thereof).

In at least one embodiment, broad aspects related to re-timing a packetized radio flow to clean noise that may be induced by PDV of packet-switched network 110 may include:

1. Providing frequency, phase, and ToD synchronization (112) for IWF nodes 104a and 104b through SYNCE and PTP 1588v2.

2. Providing a residual time stamp (TS) in a RoE frame (e.g., a packet) at an ingress IWF node of the packet-switched network 110 (e.g., one of IWF node 104a or 104b, depending on which node is transmitting the RoE frame). The RoE frame ingress time stamp may be denoted herein as 'INGRESS_TS'. In various embodiments, the INGRESS_TS may correspond to a time at which a CPRI bit stream is received from a CPRI end point (e.g., REC or RE), the time at which the CPRI bit stream is mapped into a RoE frame (also referred to as the 'packetization time'), or the time at which the RoE frame is transmitted to an opposite end IWF node 104. Additional example details related to the ingress time stamp are discussed herein with reference to FIGS. 2-4 and also FIG. 7.

3. Receiving the RoE frame at an egress IWF node (e.g., the other one of IWF node 104a or 104b, depending on the transmitting node) of the packet-switched network 110 at a time, and generating an egress time stamp, denoted herein as 'EGRESS_TS', at the egress node. Thus, in at least one embodiment, EGRESS_TS may correspond to a time at which the RoE frame is received by the egress node.

4. Assume a maximum PDV (MAX PDV) value in packet-switched network 110 within which a packet PDV will oscillate.

5. Mapping MAX PDV to a re-timing interval, denoted herein as 'DELAY_COMPENSATION_TIME', in which: MAX_PDV=DELAY_COMPENSATION_TIME.

6. To perform re-timing, the RoE frame or packet is to be delay compensated for time by calculating a re-timing value in which, generally, re-timing value=DELAY_COMPENSATION_TIME−(EGRESS_TS−INGRESS_TS). Stated differently, the re-timing value may be equal to a difference between the re-timing interval and an induced PDV or induced delay caused by transmission of a RoE frame via packet-switched network 110.

For techniques presented herein, time synchronization is provided at the ingress and egress nodes, as noted above, and DELAY_COMPENSATION_TIME−INGRESS_TS is a fixed value that may be set to be long enough to cover all possible jitter, fiber propagation delays, processing delays, serialization delays (e.g., for transmitting a CPRI bit stream to a CPRI end point), and/or any other delays that may be expected within a fronthaul network. In at least one embodiment, as per IEEE recommendations, MAX PDV may be considered to be 10% of the end-to-end (E2E) latency. Thus, for an implementation in which E2E latency is 100 microseconds (usec), MAX PDV may be assumed to be 10 usec. Other variations can be envisioned depending on implementation.

As noted above, the INGRESS_TS may be provided in a RoE packet or frame transmitted by an ingress IWF node. In at least one embodiment, as discussed in further detail with reference to FIG. 2, an ordering information field of a RoE header of a RoE frame may be used to carry time stamp information to facilitate techniques provided herein.

Figure 2:
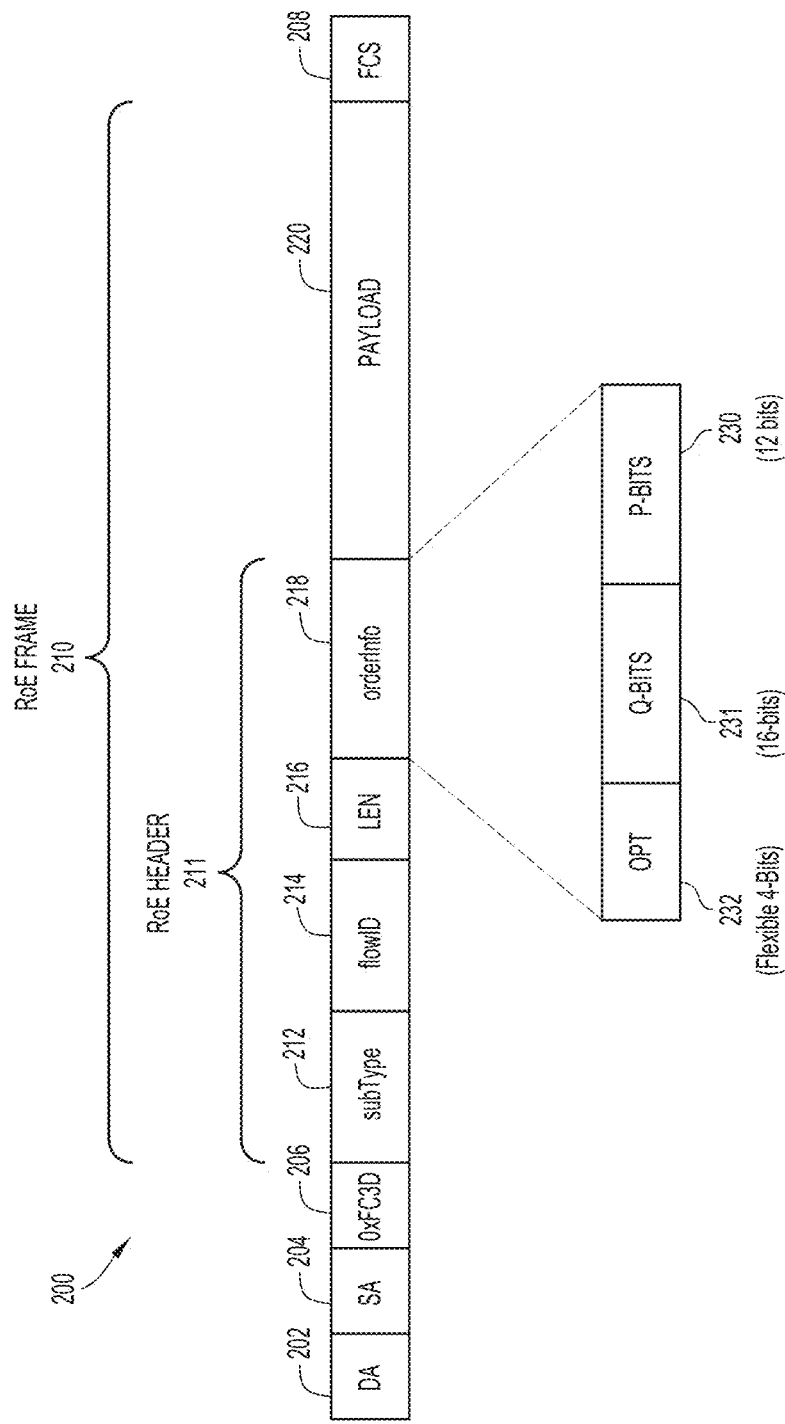
FIG. 2 is schematic diagram illustrating example details associated with a Radio over Ethernet (RoE) frame that may be used to communicate time stamp information within the fronthaul network of FIG. 1, according to an example embodiment.

Referring to FIG. 2 is a schematic diagram illustrating example details associated with fields of a RoE frame 210 (sometimes referred to as a RoE packet) that may be used to communicate time stamp information within the fronthaul network 100 of FIG. 1, according to an example embodiment. Reference is also made to FIG. 1 in connection with example details discussed for FIG. 2.

As illustrated in FIG. 2, RoE frame 210 may be encapsulated in an Ethernet frame 200. Ethernet frame 200 may include various fields including, but not limited to, a Destination Address (DA) field 202, a Source Address (SA) field 204, an Ethernet Type (EtherType) field 206, and a Frame Check Sequence (FCS) field 208. In at least one embodiment of Ethernet frame 200, DA field 202 may be set to the destination Media Access Control (MAC) address for a destination IWF node 104, depending on whichever node to which the RoE frame is to be transmitted; the SA field 204 may be set to the source MAC address for the source IWF node, depending on whichever node from which the RoE frame is transmitted; the EtherType field 206 may be set to type '0xFC3D', indicating an RoE EtherType; and the FCS field 208 may be set according to a cyclic redundancy check value, which can be set/computed based on various fields, data, etc. of the Ethernet frame 200.

RoE frame 210 may include a RoE header 211 and a RoE payload 220. The RoE header 210 may include various fields including, but not limited to, a Sub Type (subType) field 212, a flow identifier (flowID) field 214, a length (LEN) field 216, and an ordering information (orderInfo) field 218. In at least one embodiment, subType field 212 may be set to indicate a structure-agnostic data sub type (e.g., '0000 0010b'), flowID field 214 may be set to a value indicating a flow/connection between IWF nodes 104a and 104b, and length field 216 may be set to a value based on the RoE payload 220 size. The RoE payload 220 includes packetized radio data (e.g., a CPRI bit stream) and/or control information mapped therein.

According to the IEEE 1914.3 Specification, an ordering information field of a RoE header is a 32-bit field that can be configured to include one of sequence number information or time stamp information carried with a RoE frame.

However, for at least some embodiments provided herein, ordering information (orderInfo) field 218 of RoE header 211 can be enhanced to carry both time stamp information and sequence number information. In at least one embodiment, the orderInfo field 218 may include includes a P-bits field 230, a Q-bits field 231, and an optional (OPT) reserved bits field 232. The P-bits field 230 may have a length of 12-bits and may be used to carry sequence number information such as frame counter values. Each IWF node 104 may maintain a frame counter in order to encode a frame counter value in the P-bits field 230. The Q-bits field 231 may have a length of 16-bits and may be used to carry a local time stamp (e.g., INGRESS_TS) using techniques as provided herein. The optional reserved bits field may have a length of 4-bits.

In general, the length of the P-bits field 230 and the Q-bits field 231 may be flexible; however, embodiments herein may provide for synchronizing both end nodes (e.g., IWF nodes 104a and 104b) of packet-switched network 110 to utilize the same lengths for the respective fields through either static configuration and/or through RoE control channel transactions.

Figure 3:
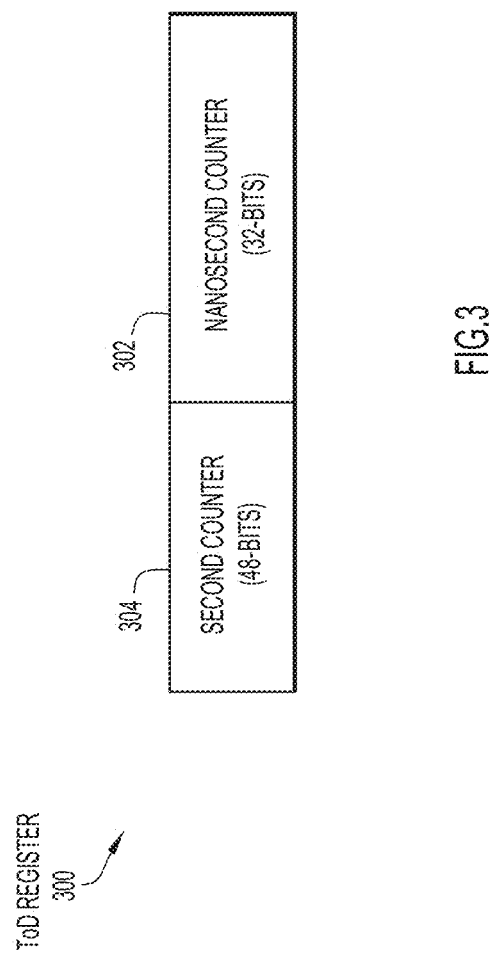
FIG. 3 is a schematic diagram illustrating example details associated with a Time of Day (ToD) register that may be maintained by an interworking function (IWF) node of the fronthaul network of FIG. 1, according to an example embodiment.

In at least one embodiment, ToD information obtained from a ToD register maintained by an IWF node 104 may be used to encode the local (residual) time stamp of the Q-bits field 231. Referring to FIG. 3, FIG. 3 is a schematic diagram illustrating example details associated with a ToD register 300 that may be maintained by each of IWF node 104a and IWF node 104b of the fronthaul network 100 of FIG. 1, according to an example embodiment. Reference is also made to FIG. 1 and FIG. 2 in connection with example details discussed for FIG. 3. As illustrated in FIG. 3, ToD register 300 may have a structure that includes a 48-bit second counter 302 and a 32-bit nanosecond counter 304.

During operation, a transmit side IWF node 104 may encode the residual time stamp (INGRESS_TS) in the orderInfo field 218 of RoE header 211. The Q-bits field 231 may be encoded with the ingress time stamp (INGRESS_TS) as a CPRI bit stream is packetized into RoE payload 220.

The structure of Q-bits field 231 may be represented as 1+15 bits in which the most significant bit (MSB) (denoted as Q[15]) can be set to '0' or '1' or, stated differently, Q[15]=0 or 1. This bit may be referred to as a 'seconds-bit' can be used to detect a second roll over between mapping/transmission of a RoE frame by one IWF node and reception of the RoE frame by another IWF node. The remaining 15 bits of the Q-bits field 231 (Q[0 . . . 14]) may be encoded as a microsecond (usec) counter value for the time stamp. In at least one embodiment, Q[15] can be set to a value of '1' to indicate an odd second value for the time stamp and can be set to a value of '0' to indicate an even second value for the time stamp. It is to be understood that this indication can be switched or otherwise varied in any manner for other embodiments of the present disclosure.

As illustrated in FIG. 3, the ToD register 300 is 80-bits wide and is organized as 48-bits for the second counter 302 and 32-bits for the nanosecond counter 304 and may be used to encode the INGRESS_TS by the transmit side (ingress) IWF node 104.

Under an assumption that the total delay (e.g., E2E delay) in fronthaul network 100 may be 100 usec (or less) and both ingress and egress IWF nodes 104 are clock synchronized with SYNCE+PTP1588v2, it may not be necessary to transmit all bits of the ToD register 300. Instead, embodiments herein may provide for transmitting a few bits and re-creating the time stamp at a peer end IWF node 104 using the received bits (e.g., contained in the Q-bits field 231). For example, 15-bits of a microsecond (usec) counter can be used to cover 32 msec.

Figure 4:
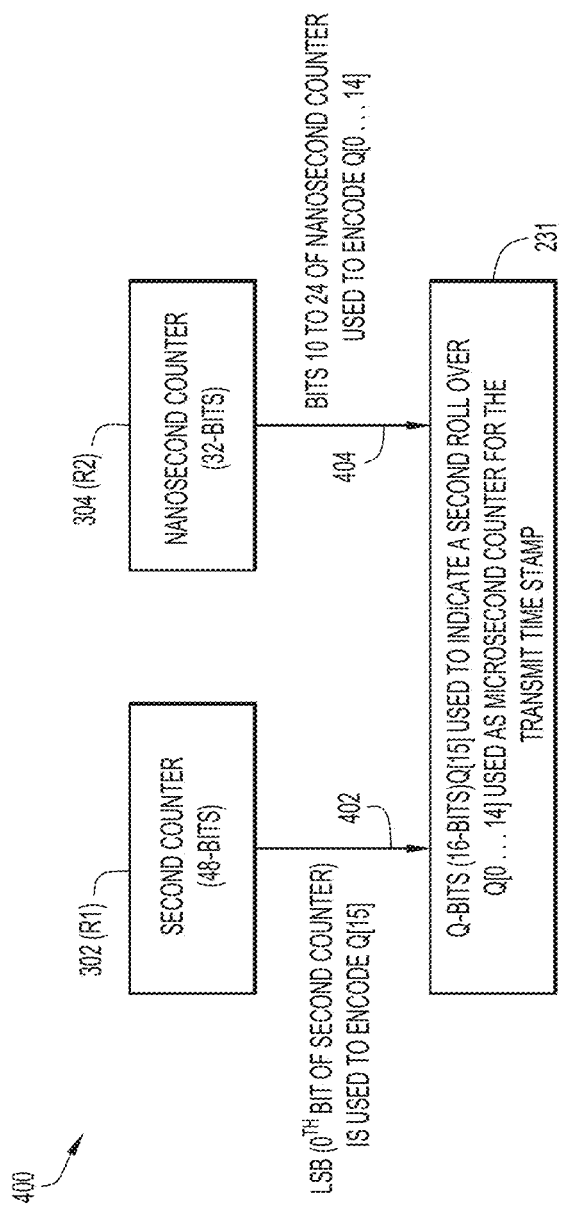
FIG. 4 is a schematic diagram illustrating example details associated with encoding a time stamp in a RoE header within the fronthaul network of FIG. 1, according to an example embodiment.

Referring to FIG. 4, FIG. 4 is a schematic diagram 400 illustrating example details associated with encoding a time stamp (e.g., INGRESS_TS) in the Q-bits field 231 of RoE header 211 within the fronthaul network of FIG. 1, according to an example embodiment. Reference is also made to FIG. 1, FIG. 2, and FIG. 3 in connection with example details discussed for FIG. 4.

At the transmit side IWF node 104, the ToD register 300 can be partitioned into two parts in which a first part can be denoted as 'R1' in which R1=48-bit second counter 302 and a second part can be denoted as 'R2' in which R2=32-bit nanosecond counter 304. The 1-bit odd or even second indication for the seconds-bit (Q[15]) that can be used by the receive side IWF node 104 for detecting a second roll over can be set by performing a 47-bit left shift operation on R1 (e.g., R1=R1<<47) to identify the least significant bit (LSB) of the second counter 302. The R1 LSB (e.g., the 0th bit of second counter 302) can be used to encode Q[15] of Q-bits field 231, as shown at 402.

The remaining 15-bits of the Q-bits field 231 (e.g., Q[0 . . . 14]) may be encoded as a microsecond counter for the time stamp by performing a 10-bit right shift operation on R2 (e.g., R2=R2>>10) and ignoring the upper 7-bits of the remaining 22-bit R2 value. Thus, R2 becomes a 15-bit microsecond counter by encoding using some number of bits, such as bits 10 to 24 of the nanosecond counter 304, which can be used to encode Q[0 . . . 14] of Q-bits field 231, as shown at 404.

As RoE frame 210 is received by an opposite end (egress) IWF node 104, two time stamps may be obtained by the receiving IWF node 104 that can be used to perform re-timing to filter PDV induced by packet-switched network 110. The two time stamps (T1 and T2) can include a first time stamp (INGRESS_TS) that may be recovered by the receiving IWF node 104 from the Q-bits field 231 of RoE header 211 and may also include a second time stamp, which may be denoted herein as 'EGRESS_TS', that can be generated by the receiving IWF node 104 upon receiving RoE frame 210.

The second time stamp (EGRESS_TS) can be generated by the receiving IWF node 104 using operations as discussed above based on the ToD register maintained by the receiving IWF node 104 (e.g., by partitioning the ToD register and determining a 16-bit time stamp from the ToD register including a 1-bit second rollover indication and a 15-bit microsecond counter value, as was described for encoding the Q-bits field). Thus, T1 can be set to INGRESS_TS and T2 can be set to EGRESS_TS.

A 15-bit maximum microsecond counter (MAX_USEC_COUNTER) value can be set such that MAX_USEC_COUNTER[0 . . . 14]=2^15, which may correspond a maximum microsecond counter value that can be represented by bits 0 to 14 of INGRESS_TS (e.g., Q[0 . . . 14]) and also bits 0 to 14 of EGRESS_TS.

The receiving IWF node 104 determines whether the seconds counter phase has changed or not (e.g., whether a second is rolled over) between the time that the RoE frame 210 was transmitted and received. This determination may be performed by identifying the most significant bit (e.g., Q[15]) of the first time stamp (INGRESS_TS) and the most significant bit of the second time stamp (EGRESS_TS) and determining whether INGRESS_TS[15]==EGRESS_TS[15].

If INGRESS_TS[15] is equal to EGRESS_TS[15], this means that no second rollover has occurred and the ingress (transmitting) IWF node 104 and the egress (receiving) IWF node are in phase with regard to the second rollover (e.g., that it has not occurred) and an induced PDV or more generally, an 'induced delay value', may be calculated by subtracting the first time stamp value from the second time stamp value (e.g., EGRESS_TS−INGRESS_TS). However, if INGRESS_TS[15] is not equal to EGRESS_TS[15], this means that a second rollover has occurred and the induced PDV may be calculated as: induced PDV=(MAX_USEC_COUNTER[0 . . . 14]−INGRESS_TS)+EGRESS_TS microseconds.

Under an assumption that MAX PDV in the network is equivalent to the re-timing interval (DELAY_COMPENSATION_TIME), in microseconds, and as per IEEE recommendations considering MAX PDV may be 10% of the E2E latency in which E2E latency is 100 usec, MAX PDV will be 10 usec. Using the calculated induced PDV (e.g., the induced delay value), the amount of time that the CPRI bit stream contained in RoE frame 210 is to be delay compensated before serializing and transmitting the CPRI bit stream to a given radio unit (via a re-timer buffer, as discussed below) may be calculated as: re-timing value=(DELAY_COMPENSATION_TIME−induced PDV) microseconds. Thus, transmission of the CPRI bit stream by the receiving IWF node may be delayed based on the re-timing value.

Techniques presented herein may provide for utilizing a re-timer buffer for re-timing a flow in which the re-timer buffer is dealing within few microseconds (e.g., 10-15 microseconds) having a 'thin' margin of error. The re-timer buffer is different from the de-jitter buffer as proposed in the IEEE 1914.3 Specification in which only buffer fill levels are tracked to tune a transmit (TX) phase-locked loop (PLL) or schedule a packet transmission. Typically, a de-jitter buffer is used in scenarios in which sync information is not available at IWF nodes. However, as IWF nodes 104a and 104b are synchronized (120), as discussed for embodiments herein, a re-timer buffer may be utilized to remove any noise (e.g., PDV) that may be picked up during transmission of RoE frames via a packet-switched network using the time-stamp and re-timing techniques discussed herein.

For example, techniques presented herein are not using a de jitter buffer to track buffer fill in order to tune the TX PLL or schedule a packet, rather techniques presented herein provide for the use of a received time stamp (INGRESS_TS) and a time stamp generated at a receiving IWF node (EGRESS_TS) to schedule packet transmission to a CPRI end point from the re-timer buffer.

Figure 5:
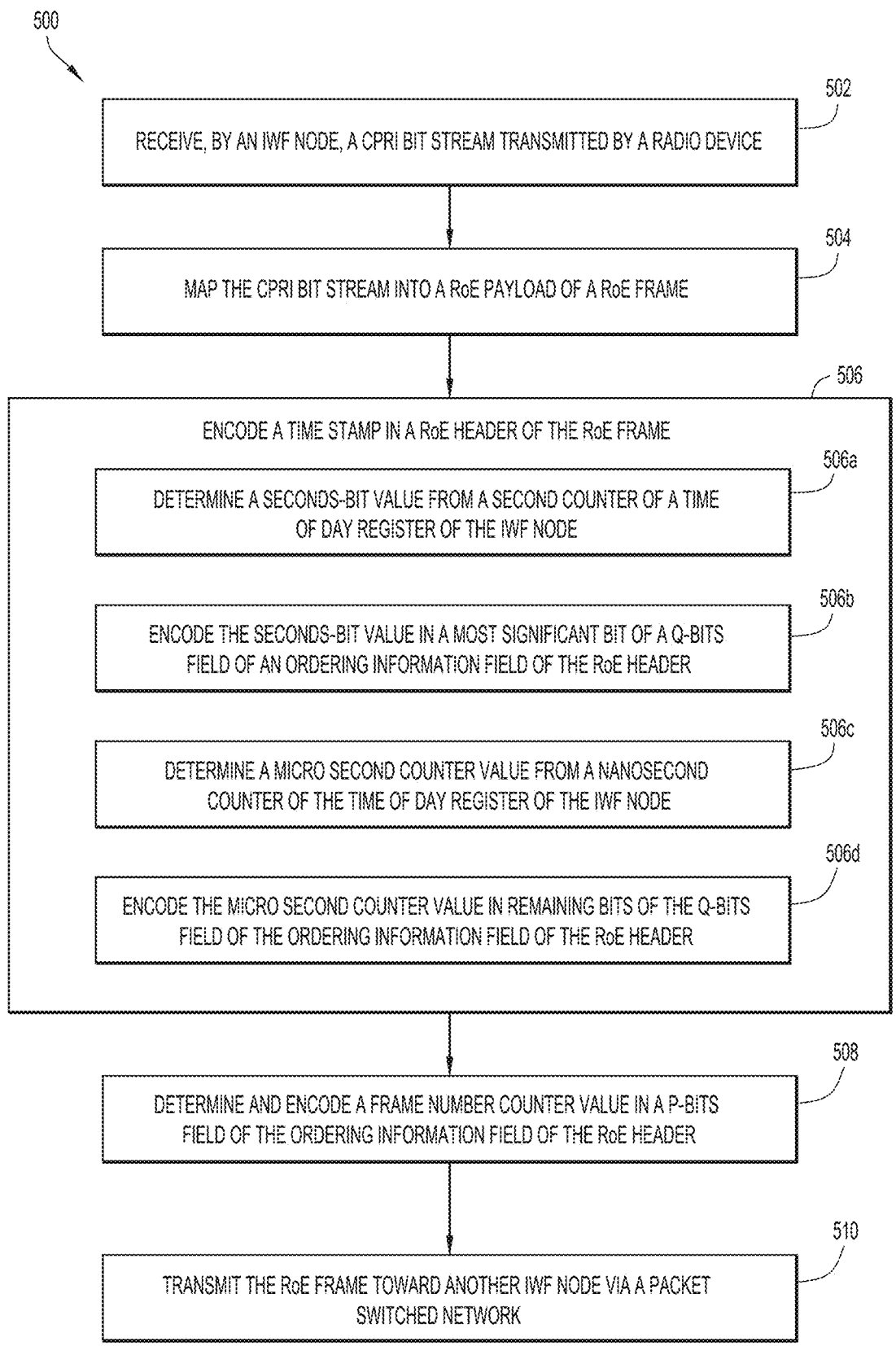
FIG. 5 is a flow chart depicting a method according to an example embodiment.

Referring to FIG. 5, FIG. 5 is a flow chart depicting a method 500 according to an example embodiment. In at least one embodiment, operations associated with method 500 may be associated with encoding a time stamp in a RoE header of a RoE frame that may be performed by an ingress IWF node for transmission of the RoE frame toward an egress IWF node of a fronthaul network (e.g., IWF node 104a that may transmit a RoE frame toward IWF node 104b, or vice-versa, via packet-switched network 110 for fronthaul network 100).

At 502, the method may include receiving, by the IWF node, a CPRI bit stream transmitted by a radio device (e.g., REC 102 or RE 106). At 504, the IWF node may map the CPRI bit stream into a RoE payload of a RoE frame (e.g., RoE payload 220 of RoE frame 210). The mapping of the CPRI bit stream into the RoE payload may be performed as prescribed by IEEE 1914.3.

At 506, the IWF node may encode a time stamp (INGRESS_TS) in a RoE header of the RoE frame (e.g., RoE header 211 of RoE frame 210). Encoding the time stamp in the RoE header may include, at 506a, determining a seconds-bit value from a second counter of a Time of Day (ToD) register maintained by the IWF node and encoding, at 506b, the seconds-bit value in a most significant bit of a Q-bits field of an ordering information field of the RoE header (e.g., as discussed above at least at 402 (FIG. 4) with regard encoding seconds-bit Q[15] of Q-bits field 231 for orderInfo field 218). Encoding the time stamp in the RoE header may further include, at 506c, determining a microsecond counter value from a nanosecond counter of the ToD register maintained by the IWF node and encoding, at 506d, the microsecond counter value in remaining bits of the Q-bits field of the ordering information field of the RoE header (e.g., as discussed above at least at 404 (FIG. 4) with regard encoding bits Q[0 . . . 14] of Q-bits field 231 for orderInfo field 218). In some embodiments, operations at 504 and 506 may be performed in parallel and/or may be reversed from the order illustrated in FIG. 5.

At 508, the IWF node may determine and encode a frame number counter value in a P-bits field of the ordering information field of the RoE header. The frame number counter value may be determined using a frame counter maintained by the IWF node. At 510, the IWF node transmits the RoE frame toward another IWF node via a packet-switched network (e.g., packet-switched network 110). The RoE frame may be encapsulated in an Ethernet frame for transmission via the packet-switched network.

Figure 6:
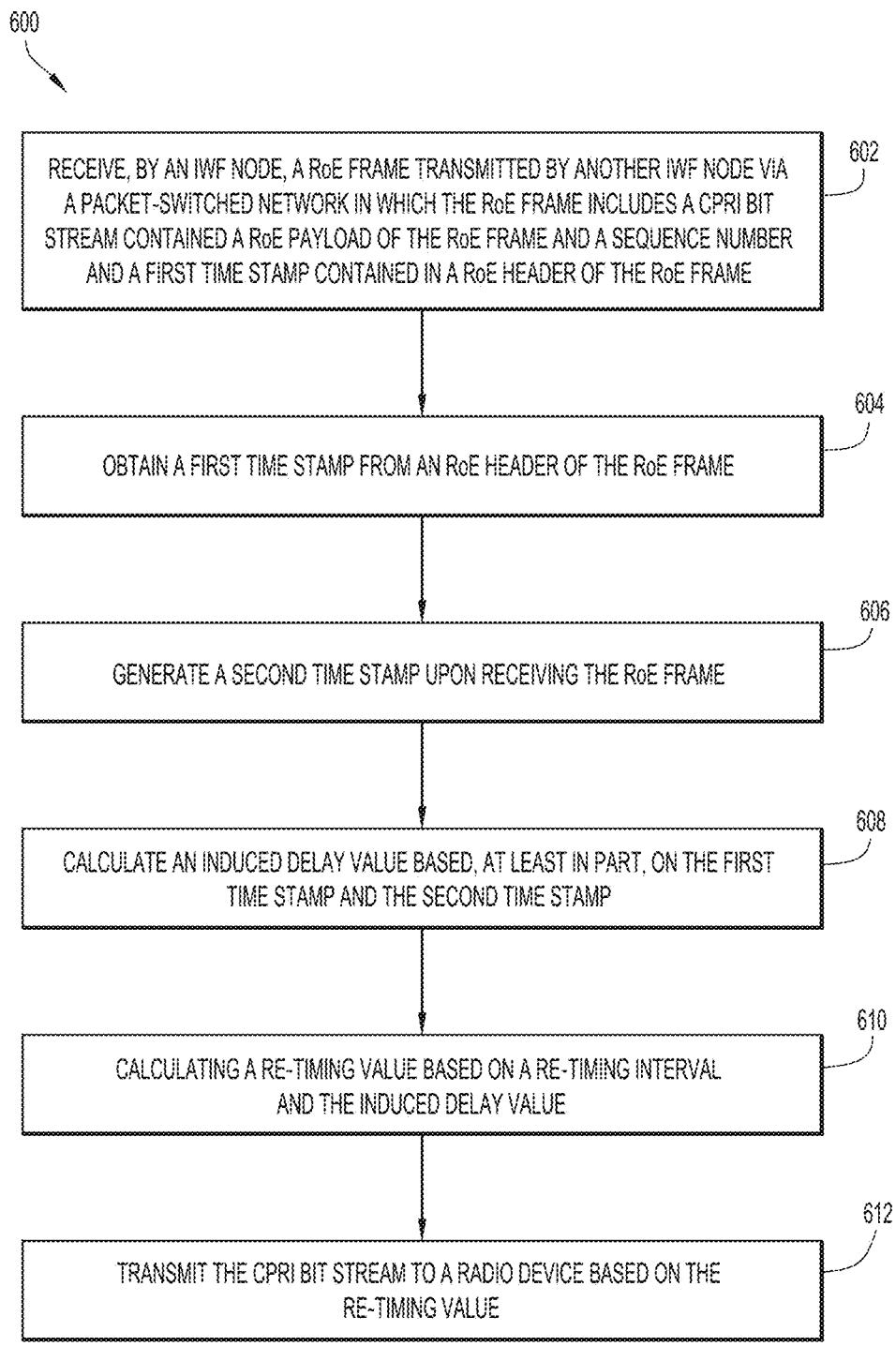
FIG. 6 is another flow chart depicting another method according to an example embodiment.

Referring to FIG. 6, FIG. 6 is another flow chart depicting another method 600 according to an example embodiment. In at least one embodiment, operations associated with method 600 may be associated with re-timing a packetized radio flow received by an IWF node to clean noise induced by PDV of a packet-switched network (e.g., by IWF node 104b that may receive a RoE frame transmitted from IWF node 104a, or vice-versa, via packet-switched network 110 for fronthaul network 100).

At 602, the method may include receiving, by the IWF node, a RoE frame transmitted from another IWF node via the packet-switched network in which the RoE frame includes a CPRI bit stream contained (e.g., mapped) in a RoE payload of the RoE frame and a sequence number and a first time stamp (e.g., INGRESS_TS) contained in a RoE header of the RoE frame (e.g., RoE frame 210). At 604, the IWF node obtains (e.g., extracts, decodes, identifies, etc.) the first time stamp from the RoE header of the RoE frame (e.g., from the Q-bits field 231 of the orderInfo field 218 of RoE header 211 of RoE frame 210).

At 606, the IWF node generates a second time stamp (e.g., EGRESS_TS) upon receiving the RoE frame. The second time stamp may be a 16-bit time stamp including a seconds-bit (e.g., EGRESS_TS[15]) and a 15-bit microsecond counter value (e.g., EGRESS_TS[0 . . . 14]) that may be generated from a ToD register maintained by the IWF node.

At 608, the IWF node calculates an induced delay value (e.g., induced PDV) based, at least in part on the first time stamp (INGRESS_TS) and the second time stamp (EGRESS_TS). In at least one embodiment, calculating the induced delay value at 608 can include comparing a seconds-bit of the first time stamp (e.g., INGRESS_TS[15]) to the seconds-bit of the second time stamp (e.g., EGRESS_TS [15]) to determine whether a second rollover has occurred. If the seconds-bit of the first time stamp is equal to the seconds-bit of the second time stamp, this means that no second rollover has occurred the induced delay value may be calculated by subtracting the first time stamp value from the second time stamp value (e.g., EGRESS_TS–INGRESS_TS). However, if INGRESS_TS[15] is not equal to EGRESS_TS[15], this means that a second rollover has occurred and the induced delay may be calculated as: induced delay=(MAX_USEC_COUNTER[0 . . . 14]–INGRESS_TS)+EGRESS_TS microseconds.

At 610, the IWF node calculates a re-timing value based on a re-timing interval and the induced delay value. In at least one embodiment, calculating the re-timing value at 610 may include calculating a difference between the re-timing interval (e.g., DELAY_COMPENSATION_TIME) and the induced delay value.

At 612, the IWF node transmits the CPRI bit stream to a radio device of the fronthaul network based on the re-timing value. In at least one embodiment, transmission of the CPRI bit stream by the IWF node may include de-mapping and, by utilizing a re-timer buffer, serializing, and transmitting the CPRI bit stream, which may be delayed based on the re-timing value. Thus, the amount of time that the CPRI bit stream is to be delay compensated is based on the re-timing value.

Figure 7:
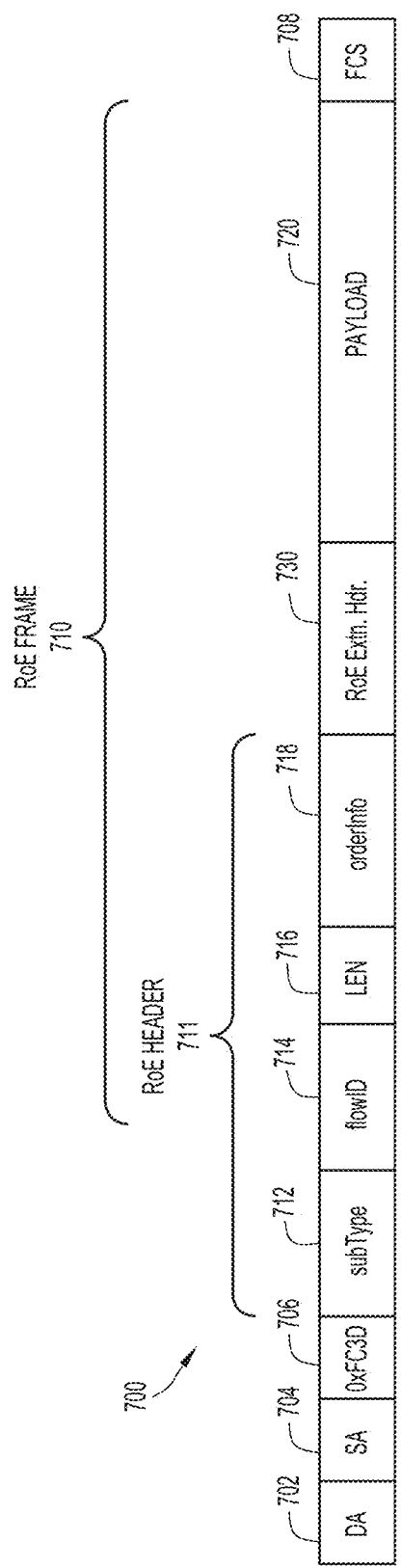
FIG. 7 is schematic diagram illustrating other example details associated with using a RoE frame to communicate time stamp information within the fronthaul network of FIG. 1, according to example embodiment.

Referring to FIG. 7, FIG. 7 is schematic diagram illustrating other example details associated with using a RoE frame to communicate time stamp information within the fronthaul network of FIG. 1, according to example embodiment. Although embodiments of FIGS. 2-6 discuss features associated with providing sequence number information and time stamp information using an orderInfo field of RoE frames, other techniques may be utilized to carry sequence number information and time stamp information within RoE frames.

FIG. 7 illustrates a RoE frame 710 encapsulated in an Ethernet frame 700. Ethernet frame 200 may include various fields including, but not limited to, a DA field 702, a SA field 704, an EtherType field 706, and a FCS field 708, each of which may be set as discussed above for Ethernet frame 200 of FIG. 2, in at least one embodiment.

RoE frame 710 may include a RoE header 711 and a RoE payload 720. In addition, RoE frame 210 may include a RoE extension header (RoE Extn. Hdr.) field 730, which may be situated between RoE header 711 and RoE payload. The contents of RoE extension header 730 may be varied in accordance with various embodiments as described below.

The RoE header 711 may include various fields including, but not limited to, a subType field 712, a flowID field 714, a length (LEN) field 716, and an orderInfo field 718. For embodiments of FIG. 7, orderInfo field 718 of RoE header 711 may carry sequence number information, as defined by the IEEE 1914.3 Specification.

In a first example embodiment, subType field 712 may be set to indicate a structure-agnostic data sub type, flowID field 714 may be set to a value indicating a flow/connection between IWF nodes 104a and 104b, and length field 716 may be set to a value based on the total number of octets following RoE header 711, not including the FCS field 708, and the RoE payload 720 may include packetized radio data (e.g., a CPRI bit stream) and/or control information mapped therein. For this first example embodiment, RoE extension header 730 may be a custom header that may have a fixed-size (e.g., 32-bits) to carry time stamp information. For such implementations, operations for IWF nodes 104 may be enhanced to perform re-timing of received RoE frames in accordance with any techniques described herein based on the number of bits of time stamp information that may be contained in RoE frames.

In a second example embodiment, subType field 712 may be set to indicate an Experimental sub type (e.g., '1111 1100b'-'1111 1111b'), flowID field 714 may be set to a value indicating a flow/connection between IWF nodes 104a and 104b, and length field 716 may be set to a value based on the total number of octets following RoE header 711, not including the FCS field 708, and the RoE payload 720 may include packetized radio data (e.g., a CPRI bit stream) and/or control information mapped therein. For this second example embodiment, RoE Extension header 730 may be any of a variable-sized RoE extension header list, fixed-sized header fields, combinations thereof, or the like. For such implementations, operations for IWF nodes 104 may be enhanced to perform re-timing of received RoE frames in accordance with any techniques described herein based on the number of bits of time stamp information that may be contained in RoE.

Figure 8:
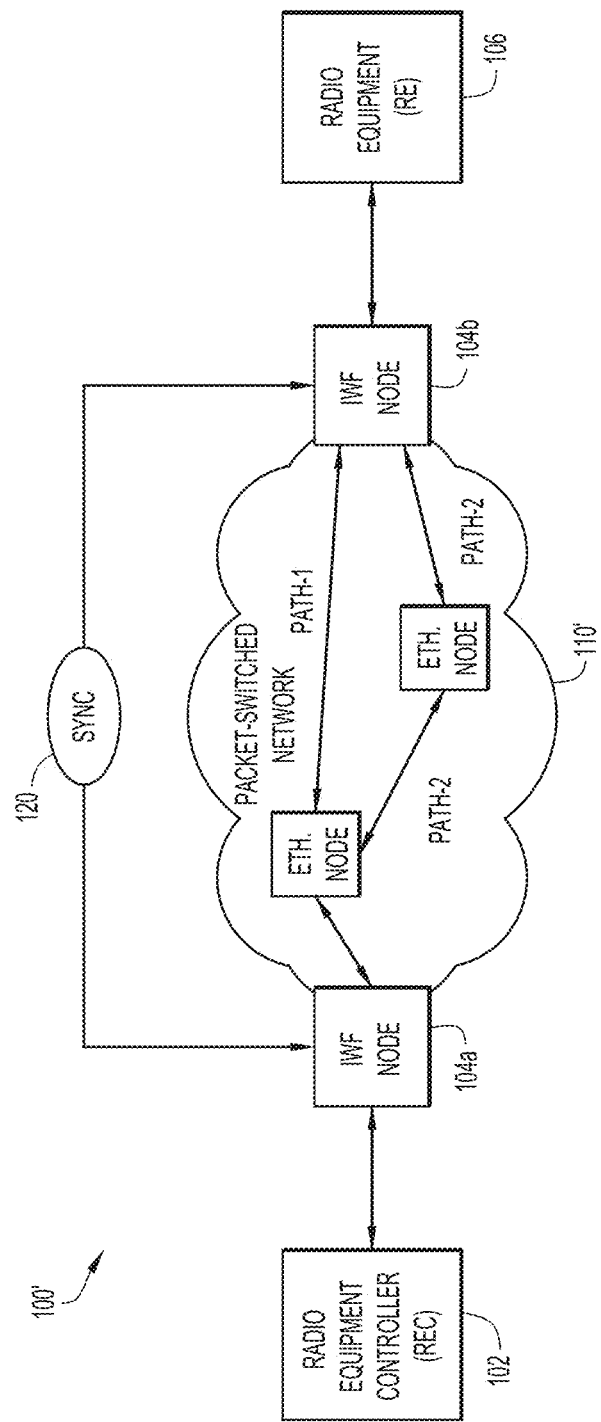
FIG. 8 is a block diagram of another fronthaul network in which techniques for re-timing a packetized radio flow to clean noise induced by packet delay variation (PDV) of a packet network may be implemented, according to an example embodiment.

Referring to FIG. 8, FIG. 8 is a block diagram of another fronthaul network 100' in which techniques for re-timing a packetized radio flow to clean noise induced by PDV of a packet network may be implemented, according to an example embodiment. In at least one embodiment, fronthaul network 100' may include REC 102, IWF nodes 104a and 104b, and RE 106. Fronthaul network 100' may further include a packet-switched network 110' that includes Ethernet nodes 112a and 112b, which may more generally be referred to as Ethernet nodes 112.

For fronthaul network 100', IWF nodes 104a and 104b at ends of the packet-switched network 110' are synchronized (120) with respect to frequency, phase, and ToD using SYNCE+PTP 1588v2 synchronization techniques.

In at least one embodiment, Ethernet nodes 112 may be any routing and/or switching nodes that may facilitate communications of RoE frames between IWF node 104a and IWF node 104b via packet-switched network 110'. As illustrated in FIG. 8, a first communication path 'Path-1' between IWF node 104a and IWF node 104b may be facilitated via Ethernet node 112a and a second communication path 'Path-2' between Ethernet node 112a and IWF node 104b may be facilitated via Ethernet node 112b.

The IEEE 1914.3 Specification mentions use of a 'presentation time' which is the sum of a source stream arrival time stamp at a mapper node (e.g., ingress IWF node) and an anticipated path delay for RoE path (hence in future) that can be included the RoE header of RoE frames. Excerpts from the IEEE 1914.3 Specification are as follows:

Using the IEEE 1914.3 specified presentation time will work in normal use case scenarios. However, in cases in which two different Ethernet based paths (with varying delay) such as Path-1 and Path-2 may be present between a single REC (REC 102) and a single RE (RE 106) (end-to-end) such as may be utilized for redundancy for use cases (e.g., Ultra-Reliable Low-Latency Communication (URLLC) use cases), the same presentation time value provided by the mapper will not work for both the flows as the end-to-end delay in both paths will not be exactly same. In still some cases, the two paths (Path-1 and Path-2) could be active-active or active-backup and may involve implementations as per IEEE 802.1CB involving replication and elimination of duplicate frames/packets.

However, techniques presented herein propose using a current residual time stamp during mapping of the original source stream (at an ingress IWF node) such that the transmit side encodes the current time stamp during RoE mapping of a RoE frame or packet. Thus, techniques presented herein that involve encoding the residual time stamp during CPRI to ROE mapping at the transmit side allow a receiver IWF node to properly re-time the CPRI bit stream after taking it through the re-timer buffer which is independent of the end-to-end network delay for the paths (not PDV).

Further, as per the IEEE1914.3 Specification, the orderInfo field of a RoE frame header can carry either sequence number information or time stamp information. Sequence number information alone is not sufficient to provide proper clean-up of PDV and re-timing of an original CPRI bit stream transmitted towards another CPRI end point in order to meet the strict jitter requirements for end-to-end CPRI flow as stipulated by CPRI Specification v7.0. Similarly, using just a time stamp alone poses a problem for achieving packet ordering at the receive end. The presence of sequence number information in the form of a p-counter value in which overflow of this indicates a radio frame boundary and a q-counter value, which is typically used for Node B frame sequencing, can useful to detect packet impairments like missing or out-of-order packets. Also, sequence number information can be used for IEEE 802.1CB stream replication and elimination support.

Accordingly, techniques presented herein provide for using both sequence number information as well as ingress time stamp information in the RoE header (e.g., by using various orderInfo field bits, using RoE extension headers, etc.).

Additionally, techniques presented herein provide for utilizing the re-timer buffer for re-timing a flow in which the re-timer buffer is dealing within few microseconds (e.g., 10-15 microseconds) having a 'thin' margin of error. The re-timer buffer is different from the de-jitter buffer as proposed in the IEEE 1914.3 Specification in which only buffer fill levels are tracked to tune a TX PLL or schedule a packet transmission. Further, it may be difficult for a normal de-jitter buffer to meet strict time alignment requirements for various use cases such as TAE.

Techniques presented are not using a de-jitter buffer to track buffer fill in order to tune the TX PLL or schedule a packet, rather techniques presented herein provide for the use of a received time stamp (INGRESS_TS) and a time stamp generated at a receiving IWF node (EGRESS_TS) to schedule packet transmission to a CPRI end point from the re-timer buffer. Thus, techniques presented herein provide for the ability to re-time radio data at precise levels for various implementations such as the stringent CPRI RTT jitter requirement of +/−16.276 nsec, Cloud Radio Access Network (C-RAN) applications involving network MIMO TX-DIVERSITY of +/−32.5 nsec, and/or inter-band Carrier Aggregation (CA) or inter-band Cubic Metric (CM) TAE of +/−130 nsec.

In summary, techniques presented herein may provide for re-timing a packetized radio flow in a fronthaul network for CBR traffic over CPRI. Techniques presented herein may also provide for the ability to minimize TAE in a cluster of nodes with respect to relative de-skew of RoE frame arrival.

Referring to FIG. 9, FIG. 9 illustrates a hardware block diagram of a computing device 900 that may perform the functions of an IWF node, referred to herein in connection with FIGS. 1-8 (e.g., IWF node 104*a* or IWF node 104*b*). It should be appreciated that FIG. 9 provides only an illustration of one embodiment and does not imply any limitations with regard to the environments in which different embodiments may be implemented. Many modifications to the depicted environment may be made.

As depicted, the computing device 900 includes a bus 912, which provides communications between computer (e.g., hardware) processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media, which can be inclusive on non-transitory computer readable storage media. In the depicted embodiment, memory 916, which may be inclusive of one or more memory element(s), may include random access memory (RAM) 924 and cache memory 926. In general, memory 916 can include any suitable volatile or non-volatile computer readable storage media. Instructions for control logic 940 may be stored in memory 916 and/or persistent storage 918 for execution by processor(s) 914. When the processor(s) 914 execute control logic 940, the processor(s) 814 are caused to perform the operations described above in connection with FIGS. 1-8. A re-timer buffer 842 may also be configured for memory 816 to perform the operations described above in connection with FIGS. 1-8.

One or more programs and/or other logic may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices using, for example, one or more CPRI port(s)/interfaces and Ethernet port(s)/interface(s). Communications unit 920 may provide communications through the use of either or both physical and wireless communications links.

I/O interface(s) 922 allows for input and output of data with other devices that may be connected to computing device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

In one form, a computer-implemented method is provided and may include receiving, at a first node of a fronthaul network, a Radio over Ethernet (RoE) frame transmitted by a second node of the fronthaul network, wherein the RoE frame comprises a Common Public Radio Interface (CPRI) bit stream associated with a first radio device of the fronthaul network, a sequence number, and a first time stamp; generating a second time stamp by the first node upon receiving the RoE frame; calculating an induced delay value based, at least in part, on the first time stamp and the second time stamp; calculating a re-timing value based on a re-timing interval and the induced delay value; and transmitting the CPRI bit stream to a second radio device of the fronthaul network based on the re-timing value.

In at least one embodiment, the first node and the second node are synchronized to a common clock. In at least one embodiment, at least one of: the sequence number and the first time stamp are contained within an ordering information field of the RoE frame; the first time stamp is contained within a fixed-sized RoE extension header; and the first time stamp is contained with a variable-sized RoE extension header list.

In at least one embodiment, the first time stamp may be contained within a q-bits counter field comprising of the ordering information field and the sequence number is contained within a p-bits counter field comprising of the ordering information field. In at least one embodiment, the q-bits counter field may be 16-bits and the p-bits counter field may be 12-bits.

In at least one embodiment, calculating the induced delay value includes: comparing a bit of the first time stamp to a bit of the second time stamp to determine whether a second rollover has occurred between transmission of the RoE frame by the second node and reception of the RoE frame by the first node. In at least one embodiment, the method may further include, based on determining a second rollover has occurred between transmission of the RoE frame by the second node and reception of the RoE frame by the first node, calculating the induced delay value as a difference between the second time stamp and the first time stamp; and calculating the re-timing value as a difference between the re-timing interval and the induced delay value. In at least one embodiment, the method may further include, based on determining that no second rollover has occurred between transmission of the RoE frame by the second node and reception of the RoE frame by the first node, calculating the induced delay value by calculating difference between a maximum counter value and the first time stamp and adding the second time stamp to the difference; and calculating the re-timing value as a difference between the re-timing interval and the induced delay value.

In at least on embodiment, the first time stamp may be 16-bits and the second time stamp may be 16-bits and comparing a bit of the first time stamp to a bit of the second time stamp to determine whether a second rollover has occurred between transmission of the RoE frame by the second node and reception of the RoE frame by the first node includes comparing a seconds-bit of the first time stamp to a seconds-bit of the second time stamp, wherein a second rollover has occurred if the seconds-bit of the first time stamp is not equal to the seconds-bit of the second time stamp.

In at least one embodiment, transmitting the CPRI bit stream to the second radio device is performed using a re-timer buffer at the first node. In at least one embodiment, the first time stamp represents a time at which the CPRI bit stream associated with the first radio device is packetized into the RoE frame.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
obtaining a Radio over Ethernet (RoE) frame, wherein the RoE frame comprises a Common Public Radio Interface (CPRI) bit stream and a first time stamp;
determining an induced delay value associated with the RoE frame, wherein determining the induced delay value includes comparing a seconds-bit of the first time stamp to a seconds-bit of a second time stamp generated when the RoE frame is obtained to determine whether a second rollover has occurred and wherein based on determining that a second rollover has not occurred, the induced delay value is determined by calculating a difference between the first time stamp and the second time stamp, and based on determining that a second rollover has occurred, the induced delay value is determined by calculating a difference between a maximum counter value and the first time stamp and adding the second time stamp to the difference;

calculating a re-timing value based on a difference between a re-timing interval and the induced delay value; and transmitting the CPRI bit stream based on the re-timing value.

2. The method of claim 1, wherein the transmitting is performed using a re-timer buffer.

3. The method of claim 1, wherein at least one of:
a sequence number and the first time stamp are contained within an ordering information field of the RoE frame;
the first time stamp is contained within a fixed-sized RoE extension header; and
the first time stamp is contained with a variable-sized RoE extension header list.

4. The method of claim 3, wherein the first time stamp is contained within a q-bits counter field comprising the ordering information field and the sequence number is contained within a p-bits counter field comprising of the ordering information field.

5. The method of claim 4, wherein the q-bits counter field is 16-bits and the p-bits counter field is 12-bits.

6. The method of claim 4, wherein a most significant bit of the q-bits counter field represents a seconds-bit and a remaining number of bits of the q-bits counter field represent a microsecond counter value.

7. The method of claim 1, wherein the RoE frame is obtained from a packet-switched network.

8. The method of claim 7, wherein the re-timing interval is based on a maximum packet delay variation (PDV) of the packet-switched network.

9. One or more non-transitory computer readable storage media encoded with instructions that, when executed by a processor, cause the processor to perform operations, comprising:

obtaining a Radio over Ethernet (RoE) frame, wherein the RoE frame comprises a Common Public Radio Interface (CPRI) bit stream and a first time stamp;

determining an induced delay value associated with the RoE frame, wherein determining the induced delay value includes comparing a seconds-bit of the first time stamp to a seconds-bit of a second time stamp generated when the RoE frame is obtained to determine whether a second rollover has occurred and wherein based on determining that a second rollover has not occurred, the induced delay value is determined by calculating a difference between the first time stamp and the second time stamp, and based on determining that a second rollover has occurred, the induced delay value is determined by calculating a difference between a maximum counter value and the first time stamp and adding the second time stamp to the difference;

calculating a re-timing value based on a difference between a re-timing interval and the induced delay value; and transmitting the CPRI bit stream based on the re-timing value.

10. The media of claim 9, wherein at least one of:
a sequence number and the first time stamp are contained within an ordering information field of the RoE frame;
the first time stamp is contained within a fixed-sized RoE extension header; and
the first time stamp is contained with a variable-sized RoE extension header list.

11. The media of claim 10, wherein the first time stamp is contained within a q-bits counter field comprising the ordering information field and the sequence number is contained within a p-bits counter field comprising of the ordering information field.

12. The media of claim 11, wherein a most significant bit of the q-bits counter field represents a seconds-bit and a remaining number of bits of the q-bits counter field represent a microsecond counter value.

13. The media of claim 9, wherein the re-timing interval is based on a maximum packet delay variation (PDV) of a packet-switch network from which the RoE frame is obtained.

14. A system comprising:
at least one memory element for storing data; and
at least one processor for executing instructions associated with the data, wherein executing the instructions causes the system to perform operations, comprising:

obtaining a Radio over Ethernet (RoE) frame, wherein the RoE frame comprises a Common Public Radio Interface (CPRI) bit stream and a first time stamp;

determining an induced delay value associated with the RoE frame, wherein determining the induced delay value includes comparing a seconds-bit of the first time stamp to a seconds-bit of a second time stamp generated when the RoE frame is obtained to determine whether a second rollover has occurred and wherein based on determining that a second rollover has not occurred, the induced delay value is determined by calculating a difference between the first time stamp and the second time stamp and based on determining that a second rollover has occurred, the induced delay value is determined by calculating a difference between a maximum counter value and the first time stamp and adding the second time stamp to the difference;

calculating a re-timing value based on a difference between a re-timing interval and the induced delay value; and transmitting the CPRI bit stream based on the re-timing value.

15. The system of claim 14, wherein the transmitting is performed using a re-timer buffer.

16. The system of claim 14, wherein at least one of:
a sequence number and the first time stamp are contained within an ordering information field of the RoE frame;
the first time stamp is contained within a fixed-sized RoE extension header; and
the first time stamp is contained with a variable-sized RoE extension header list.

17. The system of claim 16, wherein the first time stamp is contained within a q-bits counter field comprising the ordering information field and the sequence number is contained within a p-bits counter field comprising of the ordering information field.

18. The system of claim 17, wherein the q-bits counter field is 16-bits and the p-bits counter field is 12-bits.

19. The system of claim 17, wherein a most significant bit of the q-bits counter field represents a seconds-bit and a remaining number of bits of the q-bits counter field represent a microsecond counter value.

20. The system of claim 14, wherein the re-timing interval is based on a maximum packet delay variation (PDV) of a packet-switched network from which the RoE frame is obtained.

* * * * *